Jan. 17, 1967  J. H. WESSELS  3,299,335
SELF-STARTING DIRECT-CURRENT MOTORS HAVING NO COMMUTATOR
Filed March 10, 1964  2 Sheets-Sheet 1

INVENTOR.
JOHANNES H. WESSELS
BY
Frank R. Trifon
AGENT

INVENTOR.
JOHANNES H. WESSELS
BY
Frank R. Trifari
AGENT

United States Patent Office 3,299,335
Patented Jan. 17, 1967

3,299,335
SELF-STARTING DIRECT-CURRENT MOTORS HAVING NO COMMUTATOR
Johannes Hendrik Wessels, Emmasingel, Eindhoven, Netherlands, assignor to North American Philips Company, Inc., New York, N.Y., a corporation of Delaware
Filed Mar. 10, 1964, Ser. No. 350,871
Claims priority, application Netherlands, Mar. 12, 1963, 290,123
18 Claims. (Cl. 318—138)

The invention relates to a self-starting direct-current motor having no commutator and provided with a preferably permanent-magnet rotor and at least two groups of stator coils each comprising at least one coil, the currents of these coils being electronically controlled by the position of the rotor so as to selectively interconnect the stator coil circuits to the supply voltage of the motor.

In a known embodiment of such a motor, the two halves of the stator coil are each connected in the collector circuit of a switching transistor which is switched by a voltage produced by the permanent magnet of the revolving rotor in an auxiliary coil which forms part of the emitter circuit of the transistor. This arrangement has a limitation in that, owing to the presence of a possible dead position of the rotor, starting of the motor is not always ensured.

This disadvantage is avoided in the motor according to the invention by the provision of a non-magnetic part between each two successive pairs of magnetic poles of the rotor, while the rotor is provided with means by which in each position of the rotor a switch in the circuit of at least one group of stator coils is switched on.

In a motor according to the invention, in which an auxiliary pole is interposed between each pair of successive stator poles associated with the stator coils, the length of each of the non-magnetic parts of the rotor, measured along the circumference of the rotor, is at least about equal to the sum of the pole width of a main stator pole and the air gap between this stator pole and the nearest auxiliary pole. By the provision of auxiliary poles the impedance of the external magnetic circuit is made substantially constant, while by the said choice of the length of the non-magnetic parts the derivative of the flux through the main poles with respect to the angle of rotation is constant during the period of time in which the coils associated with these poles are switched into circuit (the so-called operating range), so that the torque exerted on the rotor is also constant.

Preferably the length of each of the non-magnetic parts is equal to two thirds of the pitch of the main poles. This results in optimum utilisation of the available magnetic flux so that the operating range is a maximum. The sum of the pole-width of an auxiliary pole and the air-gap between this auxiliary pole and the nearest main stator pole is chosen to be one-half of the sum of the pole-width of a main stator pole and the air gap between this stator pole and the nearest auxiliary pole.

In addition, in a motor provided with two groups of stator coils the switch in the circuit of one group of stator coils may be a photo-sensitive element which periodically receives light from a source of light through the said means provided on the rotor, while through a multivibrator circuit the switch in the circuit of the other group of stator coils is so operated by the first switch that at the instants at which the luminous flux striking the first switch varies, the second switch is switched on when the first switch is switched out, and conversely.

This ensures in a simple manner that at all times one group of stator coils is switched into circuit with the use of only one photo-sensitive element.

Alternatively, each switch may be a photo-sensitive element which periodically receives light from a light source through the said means on the rotor, while during a variation of the light influencing one of the switches a variation of light in the opposite sense is cyclically produced or has shortly before been produced in one of the other switches, the arrangement being such that when the first switch is switched off by the first mentioned light variation the other switch or switches is or are switched on, and conversely.

This enables the motor according to the invention to be used with three or more groups of stator coils.

The said means on the rotor may be a number of slit-shaped apertures which are uniformly distributed along the circumference of a circle in a flat disc secured to the rotor and the number of which is equal to the number of rotor pole pairs. With such a construction the luminous flux from the source of light to the photo-sensitive element is switched on and interrupted simply and reliably.

In order that the invention may readily be carried into effect, reference will now be made, by way of example, to the accompanying diagrammatic drawings, in which:

FIGS. 4 and 5 show the same relationship for different distributions of the magnetic parts of the rotor, while

Figure 1:
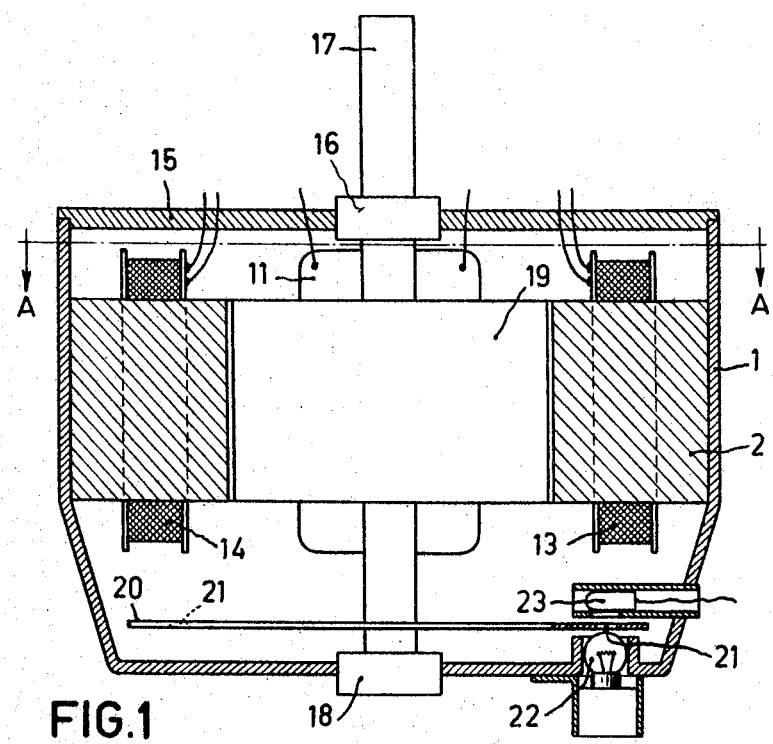
FIG. 1 is a sectional view of a motor according to the invention.
Figure 2:
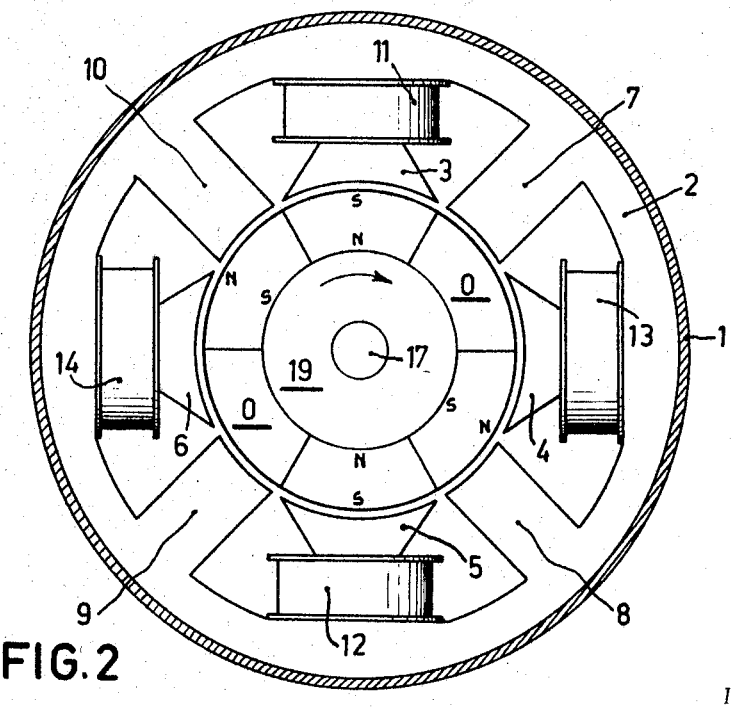
FIG. 2 is a plan of view of this motor taken on the line A—A of FIG. 1.

Referring now to FIGS. 1 and 2, the motor comprises a housing 1 containing a stator set 2 comprising four main poles 3, 4, 5 and 6 and four auxiliary poles 7, 8, 9 and 10. Stator coils 11 and 12, which together form one group, are provided on the main poles 3 and 5 while stator coils 13 and 14 forming a second group are provided on the main poles 4 and 6. At the top, the housing 2 is closed by a cover 15 in which a bearing 16 is provided through which passes a rotor shaft 17 the other end of which is accommodated in a bearing 18. A rotor 19, which preferably consists of ceramic permanent-magnet material, that is to say, of hexaferrites of Ba, Sr or Pb, and is radially magnetised in the manner shown in the figure, is secured to the rotor shaft 17. A non-magnetic part, the length of which measured along the circumference is equal to the sum of the width of a main pole and the air gap between a main pole and an adjacent auxiliary pole, is situated between each two successive pairs of magnet poles, which poles each have the same length as the non-magnetic part. The rotor shaft further carries a disc 20 provided with slots 21, which at the desired instants pass the light of an electric filament lamp 22 which operates a photo-sensitive element 23 by which the groups of stator coils 11, 12 and 13, 14 are switched into circuit.

In a particularly advantageous embodiment of the motor, the rotor is arranged externally of the stator, the magnets being glued to the inner surface of a steel jacket.

Figure 3:
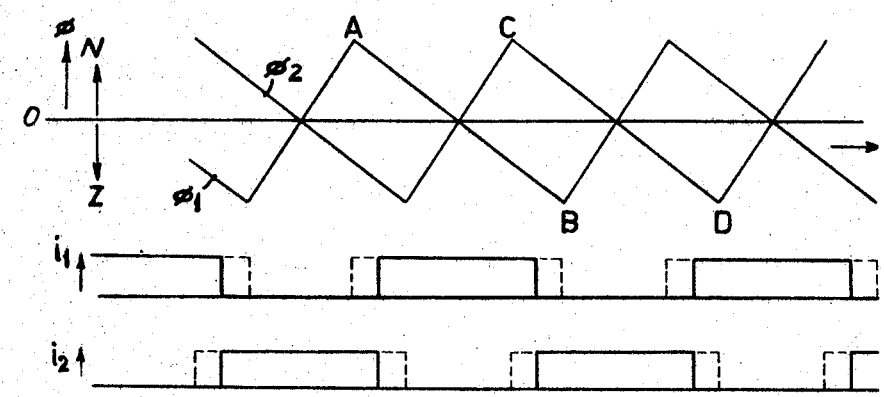
FIG. 3 shows the relationship between the flux $\phi$ through the main poles and the angle of rotation $\varphi$ of the rotor.

The arrangement shown in FIG. 2 provides a flux $\phi$ through the stator poles which varies as a function of the angle of rotation $\varphi$ in the manner shown in FIG. 3, in which the flux owing to a north pole is taken positive and of a south pole is negative.

Due to this radially asymmetrical variation of the flux $\phi$ dead points are avoided by a suitable control of the current flowing through the stator coils. If, for example, the period of time during which the group of coils comprising the coils 11 and 12 is switched on, is chosen so that the flux $\phi_1$ through the associated stator poles 3 and 5 varies in the manner shown by a line AB and the time during which the group of coils comprising the coils 13 and 14, is switched on is chosen so that the flux $\phi_2$ through the coils 13 and 14 varies in the way shown by a line CD, it will be appreciated that irrespective of the position of the rotor a torque is exerted on the rotor if at all times at least one set of stator coils is switched on, as is shown by broken lines with respect to $i_1$ and $i_2$. If it is ensured that the sum of the currents through the two groups of identical stator coils is constant, the driving torque is also constant because $d\phi/d\varphi$ is constant.

Figure 4:
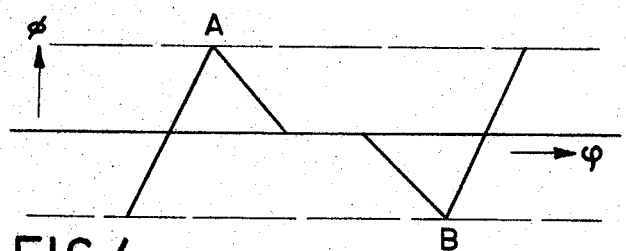

If the length of each of the non-magnetized parts of the rotor should exceed the sum of the width of a main pole and the air-gap between a main pole and an adjacent auxiliary pole while the magnetic parts are each equal to the width of a main pole, the cure would have the form shown in FIG. 4 and $d\phi/d\varphi$ would no longer be constant over the parts AB and CD.

Figure 5:
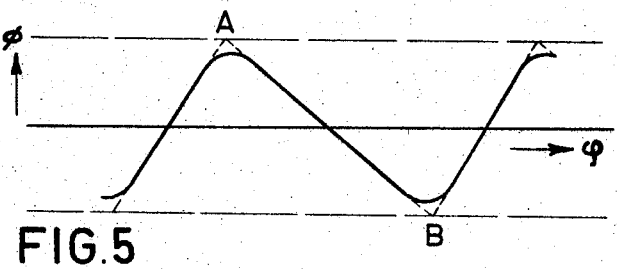

If the length of each of the magnetic parts exceeds the width of the main pole, the peaks at A and B are flattened and the available flux is not optimally utilized, as is shown in FIG. 5.

The most effective embodiment is that in which at the same time three "poles" (N, S and O) of the rotor have the same length and the length of each of the non-magnetic parts (O) is equal to the width of a main pole increased by the air gap between the said main pole and the adjacent auxiliary pole.

A particularly attractive method of control is that by means of photo-sensitive elements such as, for example, photo-cells and photo-transistors, because thus any sparking disturbances are avoided.

Figure 6:
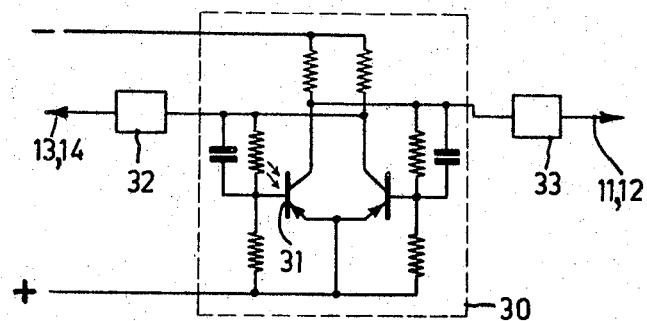
FIG. 6 is a circuit diagram of a multivibrator circuit for controlling the motor according to the invention.

A highly advantageous embodiment of such a control uses a photo-transistor which forms part of a bistable multivibrator, as is shown in FIG. 6, in which a bistable multivibrator 30 is controlled by means of light rays which either strike a photo-transistor 31 or are intercepted. The voltages in the collector circuits of the transistors each control a preferably electronic relay 32 and 33, respectively, capable of delivering the current required for the stator coils. Obviously, the transistors of the bistable multivibrator may also provide the supply for the stator coils directly if they are capable of delivering the current required. The current flowing through the coils is shown by the full lines in FIG. 3. By using the bistable multivibrator a single photo-sensitive element is sufficient for the control.

What is claimed is:

1. A direct current motor comprising a permanent magnet rotor, a source of supply voltage, a stator having at least two groups of coils, each of said groups comprising at least one winding, and control means for selectively interconnecting said voltage source with said groups of coils to effect rotation of the motor, said control means being controlled by the position of the rotor so that for each position thereof at least one group of stator coils is energized from said voltage source, said rotor comprising a plurality of radially magnetized permanent magnet members angularly spaced about the rotor circumference in pairs and a plurality of angularly spaced non-magnetic members each of which is interposed between successive pairs of said permanent magnet members about the rotor circumference, the angular spacing between adjacent pairs of permanent magnets being substantially greater than the angular spacing between the magnets of a given pair.

2. A motor as described in claim 1 wherein said stator further comprises a plurality of spaced apart main field poles associated with given ones of said stator windings and a plurality of auxiliary poles alternately arranged about the stator with said main field poles in the interpolar spaces therebetween, the circumferential length of each of said non-magnetic members facing said stator poles at least substantially equal to the pole width of a main stator pole plus the width of the air gap between said main stator pole and the adjacent auxiliary pole.

3. A motor as described in claim 2 wherein said non-magnetic member circumferential length dimension is approximately equal to two thirds of the pitch between the main stator poles.

4. A motor as described in claim 3 wherein said stator and rotor are arranged so that the sum of the pole width of an auxiliary pole and the width of the air gap between said auxiliary pole and the adjacent main stator pole is equal to one-half of the sum of the pole width of a main stator pole and the width of the air gap between said main pole and the adjacent auxiliary pole.

5. A motor as described in claim 1 wherein said stator further comprises a plurality of angularly spaced apart radially extending main field poles individually associated with first and second coil groups and a plurality of auxiliary field poles alternately arranged about the stator with said main field poles, wherein said control means comprises, first and second switching means interconnecting said voltage source and said first and second coil groups, respectively, one of said switching means including a photosensitive element, a light source, a multivibrator in circuit with said first and second switching means, and means coupled to said rotor for selectively controlling the passage of light from said light source to said photosensitive element thereby to operate said multivibrator in a manner to cause said first switching means to switch on and said second switching means to simultaneously switch off, and vice versa, as the light striking said photosensitive element is varied by said light controlling means.

6. A motor as described in claim 1 wherein said stator comprises first and second coil groups and said control means comprises, first and second switching means interconnecting said voltage source and said first and second coil groups, respectively, each of said switching means including a photosensitive element, a light source, and means coupled to said rotor for controlling the passage of light from said light source to said photosensitive elements such that for a variation of the light striking one of said photosensitive elements in one sense a variation in the light striking the other photosensitive element in the opposite sense is cyclically produced so that as one of said switching means is switched off, the other switching means is switched on, and vice versa.

7. A motor as described in claim 5 wherein said means for controlling the passage of light comprises a flat disc secured to said rotor and having a plurality of slit-shaped apertures therein uniformly distributed along the circumference of a circle, the number of said apertures being equal to the number of rotor pole pairs.

8. A motor as described in claim 2 wherein the magnet members of each pair of rotor permanent magnet members are arranged in adjoining relationship and wherein the circumferential length of each of said magnet members facing said stator poles is equal to the corresponding circumferential length of each of said non-magnetic members.

9. A motor as described in claim 1 wherein the magnet members of each pair of rotor permanent magnet members are oppositely polarized.

10. A direct current motor comprising a coaxially arranged stator and rotor, a source of supply voltage, said stator comprising an even number of circumferentially spaced apart main field poles and a like number of circumferentially spaced apart auxiliary field poles alternating with said main field poles about the stator, winding means for the stator comprising at least two groups of stator coils each of which includes at least one coil winding, each of said coil groups being individually associated with a pair of main field poles, said rotor comprising a plurality of radially extending radially magnetized permanent magnet members spaced about the rotor circumference in pairs of opposite polarity and a plurality of radially extending non-magnetic members spaced about the rotor circumference between successive pairs of said permanent magnet members, and control means for selectively interconnecting said voltage source with said groups of coils to effect rotation of the motor, said control means being controlled by the position of the rotor so that for each position thereof at least one group of stator coils is energized from said voltage source.

11. A motor as described in claim 10 wherein the rotor magnet members of each pair are aligned and adjoining one another and wherein said non-magnetic members are each aligned with and in adjoining relationship with a magnet member of the adjacent pairs of permanent magnet members so as to form along one face of the rotor a substantially continuous surface.

12. A motor as described in claim 10 wherein said stator comprises first and second coil groups and wherein said control means is arranged to energize said coil groups so that the sum of the currents in the two coil groups is constant.

13. A motor as described in claim 12 wherein said control means is arranged to energize said first and second coil groups in mutually exclusive time intervals.

14. A direct current motor comprising a permanent magnet rotor and a stator, said stator comprising a plurality of circumferentially spaced apart main field poles and a plurality of circumferentially spaced apart auxiliary field poles alternately arranged with said main field poles about the stator, at least two groups of stator coils each of which includes at least one coil winding, each of said coil groups being individually associated with a pair of main field poles, said rotor comprising a plurality of radially magnetized permanent magnet members angularly spaced about the rotor circumference in pairs of opposite polarity and a plurality of non-magnetic members angularly spaced about the rotor circumference between successive pairs of said permanent magnet members, and control means responsive to rotor rotation for energizing said stator coil groups in a sequential order such that for each position of the rotor at least one group of stator coils is energized thereby to effect rotation of the motor.

15. A motor as described in claim 14 wherein the circumferential length of each of said non-magnetic members facing said stator poles is at least substantially equal to the pole width of a main stator pole plus the width of the air gap between said main stator pole and the adjacent auxiliary pole.

16. A motor as described in claim 15 wherein said non-magnetic member circumferential length dimension is substantially equal to two thirds of the pitch between the main stator poles.

17. A motor as described in claim 14 wherein said rotor members are arranged about the rotor circumference in the following order; a first permanent magnet member, a second permanent magnet member adjoining and aligned with said first magnet member, a non-magnetic member, adjoining and aligned with said second magnet member, a third magnet member adjoining and aligned with said non-magnetic member, a fourth magnet member adjoining and aligned with said third magnetic member, a second non-magnetic member adjoining and aligned with said fourth magnet member, and so on.

18. A motor as described in claim 14 wherein the dimensions of said rotor permanent magnet members and non-magnetic members are substantially equal.

References Cited by the Examiner

UNITED STATES PATENTS

| | | | |
|---|---|---|---|
| 2,626,367 | 1/1953 | Beymer | 310—156 |
| 2,719,931 | 10/1955 | Kober | 310—156 |
| 3,023,348 | 2/1962 | Cox | 318—138 |
| 3,096,467 | 7/1963 | Angus et al. | 318—138 |
| 3,204,165 | 8/1965 | Kreutzer | 318—138 |

ORIS L. RADER, *Primary Examiner.*

G. SIMMONS, *Assistant Examiner.*